United States Patent
Zheng et al.

(10) Patent No.: US 9,529,650 B2
(45) Date of Patent: Dec. 27, 2016

(54) METHOD AND APPARATUS FOR ACCESSING HARDWARE RESOURCE

(71) Applicant: Huawei Technologies Co., Ltd., Shenzhen (CN)

(72) Inventors: Chen Zheng, Beijing (CN); Ruihua Hou, Beijing (CN); Jianfeng Zhan, Beijing (CN); Lixin Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/059,380

(22) Filed: Mar. 3, 2016

(65) Prior Publication Data
US 2016/0224399 A1 Aug. 4, 2016

Related U.S. Application Data

(63) Continuation of application No. PCT/CN2014/085793, filed on Sep. 3, 2014.

(30) Foreign Application Priority Data

Sep. 4, 2013 (CN) .......................... 2013 1 0399716

(51) Int. Cl.
*G06F 13/00* (2006.01)
*G06F 9/54* (2006.01)
(Continued)

(52) U.S. Cl.
CPC .............. *G06F 9/545* (2013.01); *G06F 9/468* (2013.01); *G06F 12/1027* (2013.01); *G06F 13/24* (2013.01); *G06F 2212/681* (2013.01)

(58) Field of Classification Search
CPC ..................................................... G06F 9/541
(Continued)

(56) References Cited

U.S. PATENT DOCUMENTS

| 7,398,532 | B1 * | 7/2008 | Barber | G06F 21/53 718/100 |
| 8,272,048 | B2 * | 9/2012 | Cooper | G06F 21/53 718/100 |
| 8,468,600 | B1 * | 6/2013 | Kaskel | G06F 21/53 726/22 |
| 8,555,295 | B2 * | 10/2013 | Karino | G06F 11/2023 709/224 |
| 8,745,745 | B2 * | 6/2014 | Mooring | G06F 9/45558 713/164 |

(Continued)

FOREIGN PATENT DOCUMENTS

| CN | 102096589 A | 6/2011 |
| CN | 103262037 A | 8/2013 |

OTHER PUBLICATIONS

Watson, R., et al., "The TrustedBSD MAC Framework: Extensible Kernel Access Control for FreeBSD 5.0," XP002622880, Freenix Track: USENIX Annual Technical Conference, Retrieved from the Internet: URL:http://www. usenix.org/event/usenix03/tech/freenix03/full_papers/watson/watson.pdf [retrieved on Feb. 16, 2011], Jun. 9, 2003, pp. 285-296.

(Continued)

*Primary Examiner* — Andy Ho
(74) *Attorney, Agent, or Firm* — Conley Rose, P.C.

(57) ABSTRACT

A method and an apparatus for accessing a hardware resource are provided. The method includes configuring permission for one or more privileged instructions that are used for hardware access such that when the privileged instructions are used by a user mode application program, the application program can access a hardware resource without trapping into a kernel, and executing the privileged instructions that are encapsulated in the privileged application programming interface (API) that is called at the code level by the application program, and a privileged instruction for direct access to a hardware resource is set and encapsulated into an API, which is deployed in user space in order to reduce system overheads for accessing the hardware resource and improve processing efficiency.

18 Claims, 4 Drawing Sheets

(51) Int. Cl.
*G06F 9/46* (2006.01)
*G06F 12/10* (2016.01)
*G06F 13/24* (2006.01)

(58) Field of Classification Search
USPC .......................................................... 719/328
See application file for complete search history.

(56) References Cited

U.S. PATENT DOCUMENTS

| | | | |
|---|---|---|---|
| 9,201,703 B2* | 12/2015 | Dunshea | G06F 9/5077 |
| 2005/0076186 A1 | 4/2005 | Traut | |
| 2012/0229481 A1 | 9/2012 | McCrary et al. | |
| 2013/0145363 A1 | 6/2013 | Eidus et al. | |

OTHER PUBLICATIONS

Caulfield, A., et al., "Providing Safe, User Space Access to Fast, Solid State Disks," XP055281711, ASPLOS, ACM SIGARCH Computer Architecture News, Retrieved from the Internet: URL: http://cseweb.ucsd.edu/~swanson/papers/Asplos2012MonetaD.pdf [retrieved on Jun. 20, 2016], Mar. 3-7, 2012, 13 pages.

Fabbri, A., "What will happen if user processes could directly interact with I/O devices without using the kernel?," XP055281715, Quora, REtrieved from the Internet: URL: https://www.quora.com/What-will-happen-if-user-processes-could-directly-interact-with-I-0-devices-without-using-the-kernel/answer/Aaron-Fabbri [retrieved on Jun. 20, 2016], Jul. 19, 2013, 1 page.

Belay, A., et al., "Dune: Safe User-level Access to Privileged CPU Features," XP061013622, USENIX, Oct. 18, 2012, 28 pages.

Foreign Communication From A Counterpart Application, European Application No. 14843079.6, Extended European Search Report dated Jul. 4, 2016, 9 pages.

Foreign Communication From A Counterpart Application, PCT Application No. PCT/CN2014/085793, English Translation of International Search Report dated Nov. 26, 2014, 2 pages.

Foreign Communication From A Counterpart Application, PCT Application No. PCT/CN2014/085793, English Translation of Written Opinion dated Nov. 26, 2014, 8 pages.

* cited by examiner

METHOD AND APPARATUS FOR ACCESSING HARDWARE RESOURCE

CROSS-REFERENCE TO RELATED APPLICATIONS

This application is a continuation of International Application No. PCT/CN2014/085793, filed on Sep. 3, 2014, which claims priority to Chinese Patent Application No. 201310399716.9, filed on Sep. 4, 2013, both of which are hereby incorporated by reference in their entireties.

TECHNICAL FIELD

Embodiments of the present disclosure relate to computer technologies, and in particular, to a method and an apparatus for accessing a hardware resource.

BACKGROUND

An operating system (OS) is a computer program that manages and controls computer hardware and software resources, exists between underlying hardware and a user, and is a bridge for communication between the underlying hardware and the user. The user may enter a command on a user interface of the operating system. The operating system interprets the command and drives a hardware device to implement a requirement of the user. A response time of hardware access is a most important indicator for evaluating performance of an operating system.

In an existing operating system, the operating system provides an interface for a hardware physical resource in a kernel, and an upper layer is encapsulated into an application programming interface (API) to be called by a user program.

Therefore, in the existing operating system, when the user program calls a related API to access the hardware resource, the system needs to trap into the kernel, and the system switches between user space and a kernel mode for multiple times. Such frequent switching increases overheads of the system, and causes decrease in processing efficiency of the system.

SUMMARY

Embodiments of the present disclosure provide a method and an apparatus for accessing a hardware resource in order to reduce system overheads for accessing the hardware resource and improve processing efficiency.

According to a first aspect, an embodiment of the present disclosure provides a method for directly accessing a hardware resource, including configuring permission for one or more privileged instructions that are used for accessing a hardware resource such that when used by a user mode application program, the one or more privileged instructions can access the hardware resource without trapping into a kernel, where the application program calls, at a code level, a privileged API that is in user mode and has the one or more privileged instructions encapsulated therein, and executing the one or more privileged instructions that are encapsulated in the privileged API that is called at the code level by the application program.

In a first possible implementation manner of the first aspect, the configuring permission for one or more privileged instructions that are used for accessing a hardware resource includes calling an interface that is related to instruction permission configuration and corresponds to a processor that supports hardware virtualization, to configure the permission for the one or more privileged instructions that are used for accessing a hardware resource.

With reference to the first aspect or the first possible implementation manner of the first aspect, in a second possible implementation manner of the first aspect, before the one or more privileged instructions that are encapsulated in the privileged API that is called at the code level by the application program are executed, the method further includes determining, using the kernel, that the application program has permission to call the privileged API to access the hardware resource.

With reference to the second possible implementation manner of the first aspect, in a third possible implementation manner of the first aspect, the determining, using the kernel, that the application program has permission to call the privileged API to access the hardware resource includes, when the application program applies, from the kernel, for calling the privileged API to directly access the hardware resource, determining, using the kernel according to a current hardware resource allocation status, to allow or partly allow a request of the application program for accessing the privileged API and a range of an instruction operation object, and it indicates that the application program has the permission to call the privileged API to access the hardware resource.

With reference to any one of the first aspect and the first to the third possible implementation manners of the first aspect, in a fourth possible implementation manner of the first aspect, the one or more privileged instructions are one or more of a processor access instruction, a memory resource access instruction, a translation lookaside buffer (TLB) access instruction, an interrupt access instruction, a network access instruction, an input/output (I/O) hardware device access instruction, a disk access instruction, and a register read/write instruction.

According to any one of the first aspect and the first to the third possible implementation manners of the first aspect, in a fifth possible implementation manner of the first aspect, the executing the one or more privileged instructions that are encapsulated in the privileged API that is called at the code level by the application program includes, after receiving a request of the application program for accessing the hardware resource, determining, according to a kernel policy, that the request of the application program for accessing the hardware resource does not need to trap into the kernel, and directly executing the one or more privileged instructions.

According to a second aspect, an embodiment of the present disclosure provides an apparatus for accessing a hardware resource, including: a configuration module configured to configure permission for one or more privileged instructions that are used for accessing a hardware resource such that when used by a user mode application program, the one or more privileged instructions can access the hardware resource without trapping into a kernel, where the application program calls, at a code level, a privileged API that is in user mode and has the one or more privileged instructions encapsulated therein, and an execution module configured to execute the one or more privileged instructions that are encapsulated in the privileged API that is called at the code level by the application program.

In a first possible implementation manner of the second aspect, the configuration module is configured to call an interface that is related to instruction permission configuration and corresponds to a processor that supports hardware virtualization, to configure the permission for the one or more privileged instructions such that when the one or more privileged instructions are used by the user mode application program, the application program can access the hardware resource without trapping into the kernel.

With reference to the second aspect or the first possible implementation manner of the second aspect, in a second possible implementation manner of the second aspect, the apparatus further includes a determining module configured to, after the configuration module configures the permission for the one or more privileged hardware access instructions, determine, using the kernel, that the application program has permission to call the privileged API to access the hardware resource, and trigger the execution module to execute the one or more privileged instructions that are encapsulated in the privileged API that is called at the code level by the application program.

According to the second possible implementation manner of the second aspect, in a third possible implementation manner of the second aspect, the determining module is configured to, when the application program applies, from the kernel, for calling the privileged API to directly access the hardware resource, determine, using the kernel according to a current hardware resource allocation status, to allow or partly allow a request of the application program for accessing the privileged API and a range of an instruction operation object, and it indicates that the application program has the permission to call the privileged API to access the hardware resource.

With reference to any one of the second aspect and the first to the third possible implementation manners of the second aspect, in a fourth possible implementation manner of the second aspect, the one or more privileged instructions are one or more of a processor access instruction, a memory resource access instruction, a TLB access instruction, an interrupt access instruction, a network access instruction, an I/O hardware device access instruction, a disk access instruction, and a register read/write instruction.

According to any one of the second aspect and the first to the third possible implementation manners of the second aspect, in a fifth possible implementation manner of the second aspect, the execution module is configured to, after receiving a request of the application program for accessing the hardware resource, determine, according to a kernel policy, that the request of the application program for hardware access does not need to trap into the kernel, and directly execute the one or more privileged instructions.

According to a third aspect, an embodiment of the present disclosure provides a computer system, including a processor, a memory, and a bus, where the processor and the memory communicate with each other using the bus, the memory is configured to store instructions that need to be executed, and the processor is configured to execute, by means of reading the instructions stored in the memory, the methods for accessing a hardware resource in the first aspect and the possible implementation manners of the first aspect.

According to a fourth aspect, an embodiment of the present disclosure provides a non-volatile storage medium, the non-volatile storage medium includes some instructions, the instructions may be executed by a processor in a computer, and the methods for accessing a hardware resource in the first aspect and the possible implementation manners of the first aspect are executed by executing the instructions.

In the embodiments of the present disclosure, permission for a privileged instruction for accessing a hardware resource is configured such that when an application program accesses a hardware resource, the application program can access the hardware resource by executing the privileged instruction encapsulated in a privileged API that is called at a code level by the application program, without trapping into a kernel. In other words, the application program can directly access the hardware resource without using the kernel, which, to some extent, resolves a problem in the prior art that to access a hardware resource, an application program needs to trap into the kernel, causing that multiple times of switching between a user mode and a kernel mode is needed, and therefore, causing excessively large system overheads, thereby reducing system overheads for accessing the hardware resource and improving processing efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Embodiment 1

Figure 1:
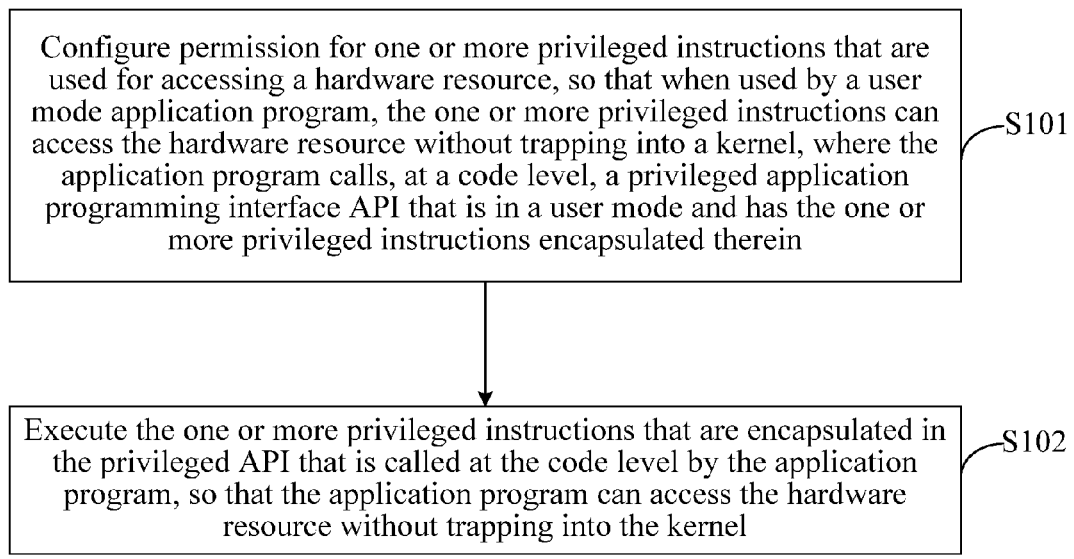
FIG. 1 is a flowchart of a method for accessing a hardware resource according to Embodiment 1 of the present disclosure.

FIG. 1 is a flowchart of Embodiment 1 of a method for accessing a hardware resource according to the present disclosure. The method for accessing a hardware resource provided in this embodiment of the present disclosure may be used in a computer system (which may include one or more processors, and one or more memories) shown in FIG. 5. The computer system may be located on one physical host, or may be distributed on multiple physical hosts. The computer system may be located on one or more devices of a type such as a computer (that is, a computing node), a portable computer, a handheld device (such as a mobile phone, a tablet computer like an iPAD), or a server. For a software and hardware logical structure of the computer, reference may be made to FIG. 6. As shown in FIG. 6, the computing node includes a hardware resource (that is, a hardware layer). The hardware resource here includes a processor (such as a central processing unit (CPU) and a graphics processing unit (GPU)), and certainly, may further include a memory, an input/output device, a network interface, and the like, and include kernel space above the hardware layer, and user space above the kernel space. It should be noted that the kernel space here includes a kernel and the like, and the user space here includes some application programs.

As shown in FIG. 1, the method includes the following steps.

Step 101: Configure permission for one or more privileged instructions that are used for accessing a hardware resource such that when used by a user mode application program, the one or more privileged instructions can access the hardware resource without trapping into a kernel, where the application program calls, at a code level, a privileged API that is in user mode and has the one or more privileged instructions encapsulated therein.

In this step, the hardware resource may include but is not limited to one or more of a CPU resource, a memory resource, a TLB resource, an interrupt resource, a network resource, an I/O hardware device resource, a disk resource, and a register resource.

In this step, a plurality of methods may be used to implement "calling a privileged API at a code level". For example, a developer is made to know existence of a privileged API, and when the developer writes code, the privileged API is directly used to access the hardware resource, or when writing code, the developer may not know the existence of the code, and the developer still uses an existing standard API to access the hardware resource, but code of the existing standard API has been modified, function content encapsulated in an interface function is about to be modified, and the modified existing API calls the privileged API to access the hardware resource.

For a time when the permission for one or more privileged hardware access instructions is configured, it may be set by sending a trigger instruction to the kernel after the application program runs, or it is set when the kernel creates the application.

Step 102: Execute the one or more privileged instructions that are encapsulated in the privileged API that is called at the code level by the application program such that the application program can access the hardware resource without trapping into the kernel.

Corresponding to the hardware resource, the one or more privileged instructions may be one or more of a processor access instruction, a memory resource access instruction, a TLB access instruction, an interrupt access instruction, a network access instruction, an I/O hardware device access instruction, a disk access instruction, and a register read/write instruction, such as several specific privileged instructions shown in Table 1.

TABLE 1

| Hardware resource | Hardware resource access instruction |
|---|---|
| CPU | Read/write control registers cr0-cr15<br>Read/write data buffer registers dr0-dr15<br>Read/write exception vectors 0-31<br>Read/write memory management registers interrupt descriptor table register (IDTR), global descriptor |

TABLE 1-continued

| Hardware resource | Hardware resource access instruction |
|---|---|
| | table register (GDTR), local descriptor table register (LDTR) and task register (TR)<br>Segmented operation instructions local global descriptor table (LGDT) and local local descriptor table (LLDT)<br>Read/write assembly instructions<br>read time-stamp counter (Rdtsc), read performance-monitoring counters (rdpmc), push flags onto stack (pushf), pop flags register from stack (popf), run virtual machine (vmrun), enter halt state (hlt), invalidate TLB entry (invlpg), call to interrupt (int), and Return from interrupt (iret) |
| Memory | Memory operation instructions<br>moves to control registers (Mov CRn),<br>invalidate TLB entry (INVLPG), and invalidate process-context identifier (INVPCID) |
| Hardware interrupt | Exception handling instructions<br>load interrupt descriptor table (LIDT), load task register (LTR), return from interrupt (IRET), set interrupt flag STI, and clear interrupt flag (CLI) |

Because these privileged instructions are encapsulated into an API and deployed in user space, when a user program calls a related system call, it is not needed to generate an interrupt number, such as int 0×80 in order to trap into the kernel, but a physical resource is directly accessed using the API in user task address space.

In this embodiment of the present disclosure, permission for a privileged instruction for accessing a hardware resource is configured such that when an application program accesses a hardware resource, the application program can access the hardware resource by executing the privileged instruction encapsulated in a privileged API that is called at a code level by the application program, without trapping into a kernel. In other words, the application program can directly access the hardware resource without using the kernel, which, to some extent, resolves a problem in the prior art that to access a hardware resource, an application program needs to trap into the kernel, causing that multiple times of switching between a user mode and a kernel mode is needed, and therefore, causing excessively large system overheads, thereby reducing system overheads for accessing the hardware resource and improving processing efficiency.

Embodiment 2

Figure 2:
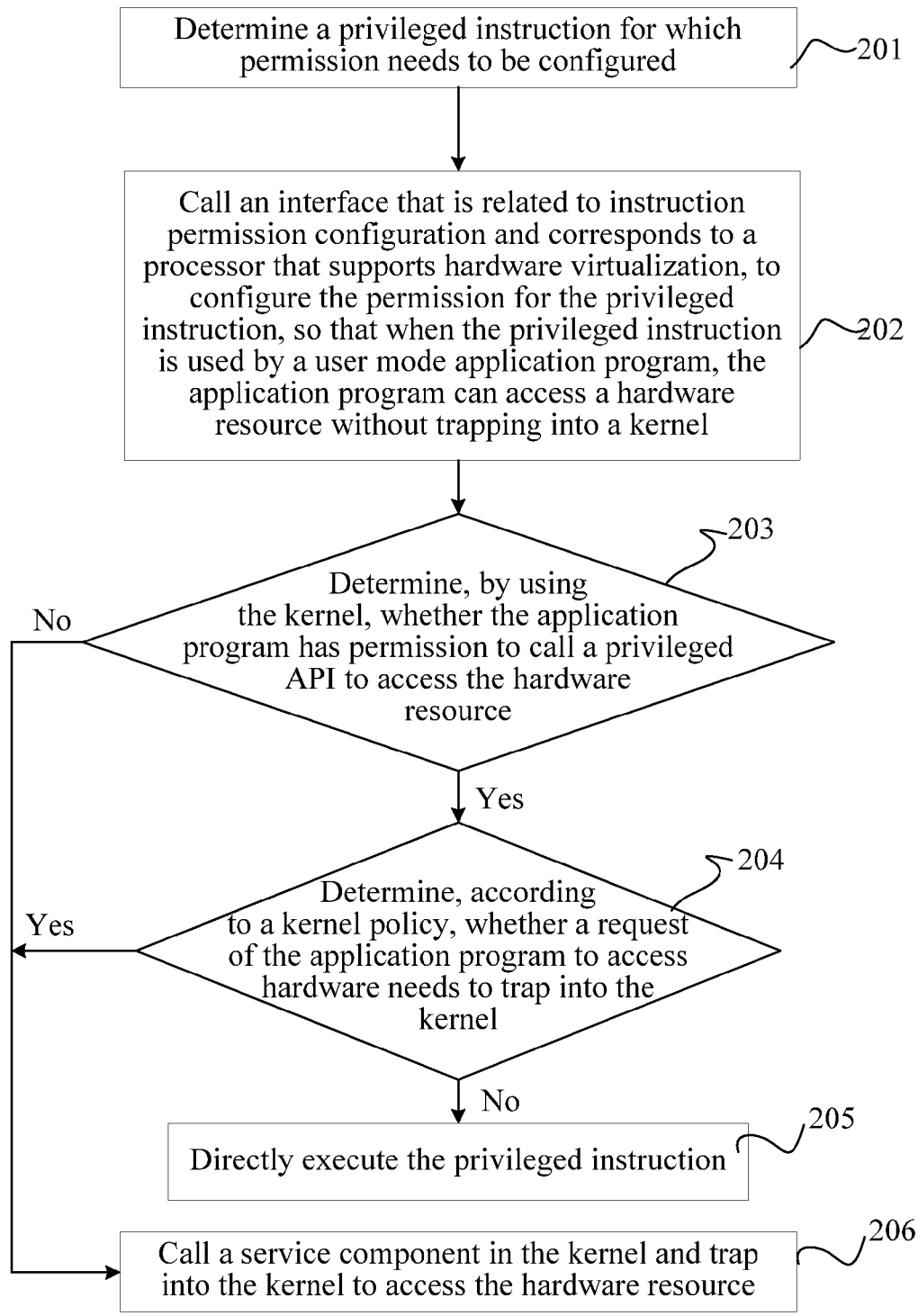
FIG. 2 is a flowchart of a method for accessing a hardware resource according to Embodiment 2 of the present disclosure.

FIG. 2 is a flowchart of Embodiment 2 of a method for accessing a hardware resource according to the present disclosure. Based on the foregoing embodiment, this embodiment provides an embodiment in which setting of a privileged instruction for accessing a hardware resource is further implemented, and a security mechanism for a user program to access an API is added. As shown in FIG. 2, the method includes the following steps.

Step 201: Determine a privileged instruction for which permission needs to be configured.

In this step, the privileged instruction that needs to be set may be determined from an instruction for accessing a hardware resource and according to a hardware resource that needs to be called by a user program, an allocation and usage state of a hardware resource, or an open hardware resource set by a system according to a security mechanism. For example, when a user program needs to call an interrupt resource and a network resource, an operating system may determine an instruction for accessing the interrupt resource and the network resource as the privileged instruction that needs to be set.

Step 202: Call an interface that is related to instruction permission configuration and corresponds to a processor that supports hardware virtualization, to configure the permission for the privileged instruction such that when the privileged instruction is used by a user mode application program, the application program can access a hardware resource without trapping into a kernel.

This embodiment may be executed based on a processor (which is also referred to as "virtualization hardware" below) that supports hardware virtualization, for example, an INTEL processor that supports hardware virtualization using a virtualization technology (VT) solution, or an AMD processor that supports hardware virtualization using a secure virtual machine (SVM) solution. This type of processor provides a related permission configuration interface to configure the permission for the determined privileged instruction.

Setting of a control data structure in virtualization hardware may be implemented using the following method.

A portable operating system interface (Posix) of a system kernel generally provides an additional preset interface for the user program, and the user program directly calls the preset interface and traps into the kernel to call the interface that is related to instruction permission configuration and corresponds to a processor that supports hardware virtualization, to configure the permission for the privileged instruction.

The INTEL VT technology is used as an example for detailed description below. To accelerate execution of a virtual machine, the virtualization hardware extends an original hardware privilege level, and on the basis of an original privilege level from ring 0 to ring 4, a virtual-machine extension (VMX) root mode and a VMX non-root mode are added. Besides, a programmable hardware data structure—virtual-machine control structure (VMCS) is added to determine and set a range of executable instructions allowed at different hardware privilege levels. The data structure VMCS may be considered as the "interface that is related to instruction permission configuration and corresponds to a processor". The VMX root mode is equivalent to the traditional ring 0 privilege level, and for setting of the VMCS, that is, for determining of an executable instruction applied in the VMX non-root mode, setting and initialization can only be performed on an application in the VMX root mode. When a privileged instruction that is not allowed is executed in the VMX non-root mode, hardware traps into the VMX root mode to perform processing. Therefore, using existing virtualization hardware, the virtualization hardware is initialized and set in a kernel. The kernel is set to a host mode, that is, a VMX root mode, and an application program is set to a guest mode, that is, a VMX non-root mode. Using an apparatus, in a kernel in the VMX root mode, for accessing a hardware resource, a VMCS data structure built-in in INTEL VT-x hardware is set in order to initialize and set privileged instructions, of the hardware resource, that can be directly accessed by a program in the VMX non-root mode, and the hardware does not need to trap into the VMX root mode in order to ensure that an application may be executed directly in user space without using the kernel, for example, a memory operation instruction Mov CRn is set to be executed directly in the user space.

In this step, further, the privileged hardware access instruction is encapsulated into a privileged API, to provide an interface for a user program to access hardware. The API may be customized as a low-level API. In this way, the low-level API is a combination of a group of privileged instructions, and can implement direct access operation on a CPU, a memory, a disk, an I/O device, and the like. It may be specified that the low-level API is called by a task in a fixed memory area, or may also be compiled into an application when the application is being prepared. Meanwhile, the low-level API may be further encapsulated to implement general kernel functions, such as functions of process switching, page table creating, and memory management. The encapsulated interfaces may form the low-level API together with an interface for directly accessing and operating a physical resource, or may be used as an upper layer encapsulation function of the low-level API.

Step 203: Determine, using the kernel, whether the application program has permission to call the privileged API to access the hardware resource, and if the application program has the permission to call the privileged API to access the hardware resource, perform step 204. If the application program does not have the permission to call the privileged API to access the hardware resource, perform step 206, the application program calls a service component in the kernel and traps into the kernel to access the hardware resource.

When the application program starts an initialization task, an operating system may allocate a corresponding resource and permission to access the low-level API to the application program according to a hardware resource allocation policy of the kernel. For example, according to a priority of an application program, the operating system authorizes access of an application program with a high priority to the API, and does not authorize or partly authorizes access of an application program with a low priority to the API such that the application program with a high priority can quickly access desired hardware using the API.

After the kernel determines and sets permission and a range for an application access instruction, the application program may directly execute the instructions that are allowed by the kernel without trapping into the kernel. Otherwise (if an instruction executed by an application is not allowed, or a range of an instruction operation object exceeds a preset range allowed by the kernel in advance), the application program traps into the kernel, and the kernel perform determining and execution or exception handling.

If the application program applies, from the kernel, for calling the privileged API to directly access the hardware resource, it may be determined, using the kernel according to a current allocation status of the physical resource, whether to allow or partly allow a request of the application program for accessing the privileged API and a range of an instruction operation object, and if yes, it indicates that the application program has the permission to call the privileged API to access the hardware resource.

Step 204: Determine, according to a kernel policy, whether a request of the application program for hardware access needs to trap into the kernel, and if it is determined that the request of the application program for hardware access does not need to trap into the kernel, perform step 205. Otherwise, perform access still in a normal manner, that is, the application program calls a service component in the kernel and traps into the kernel to access the hardware resource.

It can be learned from step 202 that an instruction set of the low-level API is set and determined by the kernel, and therefore, to avoid large system processing overheads, resource access conflicts, and even breakdown that are caused when lots of application programs having an access permission of the low-level API simultaneously call a hardware resource instruction of the low-level API, the kernel may determine, based on a preset policy, whether to allow an application program having the access permission of the low-level API to directly execute an instruction in the low-level API. The preset policy may be set by the kernel according to a factor such as reliability of the application program or a usage state of the hardware resource, this setting is a technology well known by persons skilled in the art, and no further details are provided herein again. If an application is allowed to execute an instruction without trapping into the kernel, the instruction may be executed directly. If the instruction is not set to be included in a privileged API set, when an application is executed, hardware trapping is caused, and the kernel performs exception handling.

Step 205: Directly execute the privileged instruction.

In this embodiment, virtualization hardware (for example, an INTEL processor based on the VT-x technology and an AMD processor based on the SVM technology) is set in advance, to ensure that when some privileged instructions are executed, the hardware does not need to trap into a kernel mode, and privileged instructions for accessing all hardware resources are encapsulated into an API, and the API is deployed in user space such that when an application program accesses a hardware resource, the application program may directly access hardware without trapping into the kernel, thereby improving an access speed and reducing overheads of trapping into the kernel. Besides, access authorization of an application is implemented in the kernel, and the kernel performs determining according to a policy such that security and reliability of hardware access by the application program is improved, and a security problem caused by bypassing the kernel for access is avoided.

Further, based on this embodiment, when a privileged instruction called by the application program does not belong to a privileged API set that is initialized by the kernel for the application program, hardware traps into a hardware privilege level of the kernel, causing the kernel to perform exception handling. The kernel determines, according to an execution request of the instruction and a current resource allocation state, whether to execute the instruction of the request or prevent the instruction from being executed in the kernel in order to ensure that no conflict is caused when application programs access the hardware resource, thereby improving a security mechanism.

Embodiment 3

Figure 3:
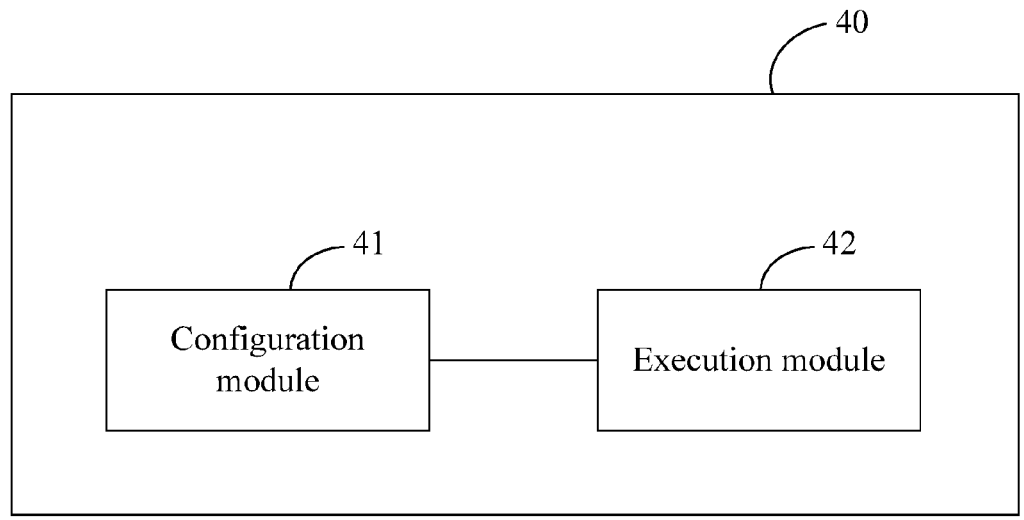
FIG. 3 is a structural diagram of an apparatus for accessing a hardware resource according to Embodiment 3 of the present disclosure.

Referring to FIG. 3, based on the foregoing embodiments, this embodiment of the present disclosure provides an apparatus 40 for accessing a hardware resource, and the apparatus includes a configuration module 41 configured to configure permission for one or more privileged instructions that are used for hardware access such that when used by a user mode application program, the one or more privileged instructions can access the hardware resource without trapping into a kernel, where the application program calls, at a code level, a privileged API that is in user mode and has the one or more privileged instructions encapsulated therein, and an execution module 42 configured to execute the one or more privileged instructions that are encapsulated in the privileged API that is called at the code level by the application program such that the application program can access the hardware resource without trapping into the kernel.

In this embodiment of the present disclosure, the configuration module 41 is configured to call an interface that is related to instruction permission configuration and corresponds to a processor that supports hardware virtualization, to configure the permission for the one or more privileged instructions such that when the one or more privileged instructions are used by the user mode application program, the application program can access the hardware resource without trapping into the kernel.

Figure 4:
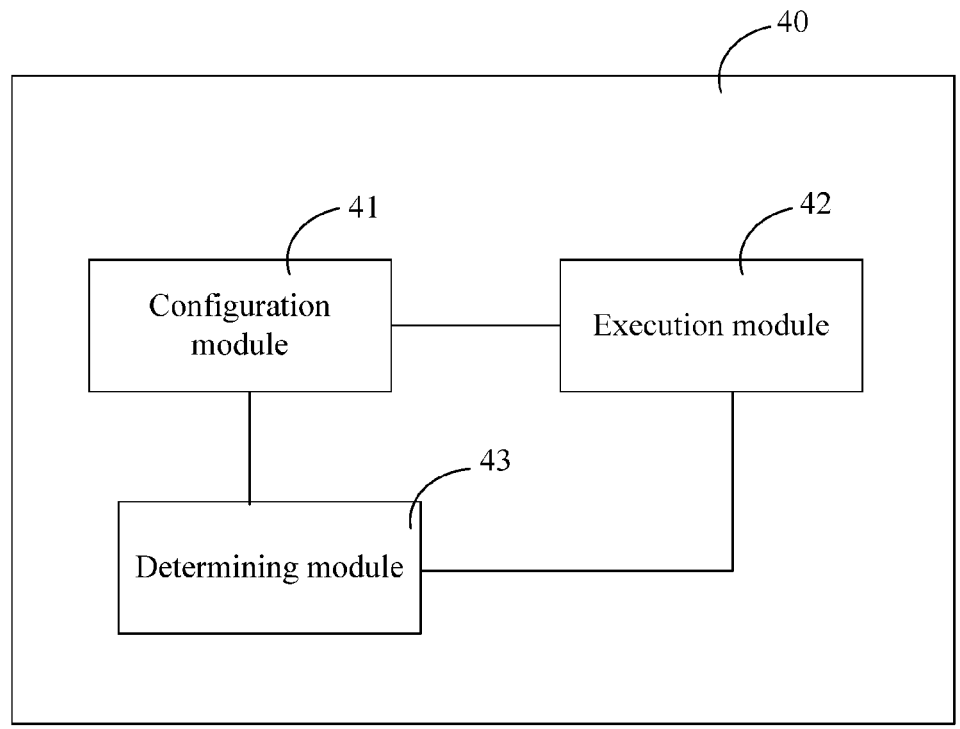
FIG. 4 is another structural diagram of an apparatus for accessing a hardware resource according to Embodiment 3 of the present disclosure.

Referring to FIG. 4, this embodiment of the present disclosure further includes a determining module 43 configured to, after the configuration module configures the permission for one or more privileged hardware access instructions, determine, using the kernel, whether the application program has permission to call the privileged API to access the hardware resource, and if the application program has the permission to call the privileged API to access the hardware resource, trigger the execution module to execute the one or more privileged instructions that are encapsulated in the privileged API that is called at the code level by the application program.

The determining module 43 is configured to, if the application program applies, from the kernel, for calling the privileged API to directly access the hardware resource, determine, using the kernel according to a current hardware resource allocation status, whether to allow or partly allow a request of the application program for accessing the privileged API and a range of an instruction operation object, and if yes, it indicates that the application program has the permission to call the privileged API to access the hardware resource.

The one or more privileged instructions in this embodiment of the present disclosure may be one or more of a processor access instruction, a memory resource access instruction, a TLB access instruction, an interrupt access instruction, a network access instruction, an I/O hardware device access instruction, a disk access instruction, and a register read/write instruction.

In this embodiment of the present disclosure, the execution module is configured to, after receiving a request of the application program for accessing the hardware resource, determine, according to a kernel policy, whether the request of the application program for hardware access needs to trap into the kernel, and if not, directly execute the one or more privileged instructions.

Specific execution manners of the foregoing modules may be performed based on specific methods described in the foregoing embodiments, and no further details are provided herein again.

The modules in this embodiment of the present disclosure are merely divided by logic, which may be implemented based on existing computer software and hardware. For example, a computer includes hardware devices such as a processor (such as a CPU) and a memory, the processor (such as the CPU) reads program code stored in the memory and runs an operating system such as Linux, and the operating system may further include different space such as a kernel mode and a user mode (where reference may be made to FIG. 6). The processor (such as the CPU) running a function in the operating system may be considered as a module in this embodiment of the present disclosure executing a corresponding function.

In this embodiment of the present disclosure, permission for a privileged instruction for accessing a hardware resource is configured such that when an application program accesses a hardware resource, the application program can access the hardware resource by executing the privileged instruction encapsulated in a privileged API that is called at a code level by the application program, without trapping into a kernel. In other words, the application program can directly access the hardware resource without using the kernel, which, to some extent, resolves a problem in the prior art that to access a hardware resource, an application program needs to trap into the kernel, causing that multiple times of switching between a user mode and a kernel mode is needed, and therefore, causing excessively large system overheads, thereby reducing system overheads for accessing the hardware resource and improving processing efficiency.

Embodiment 4

Figure 5:
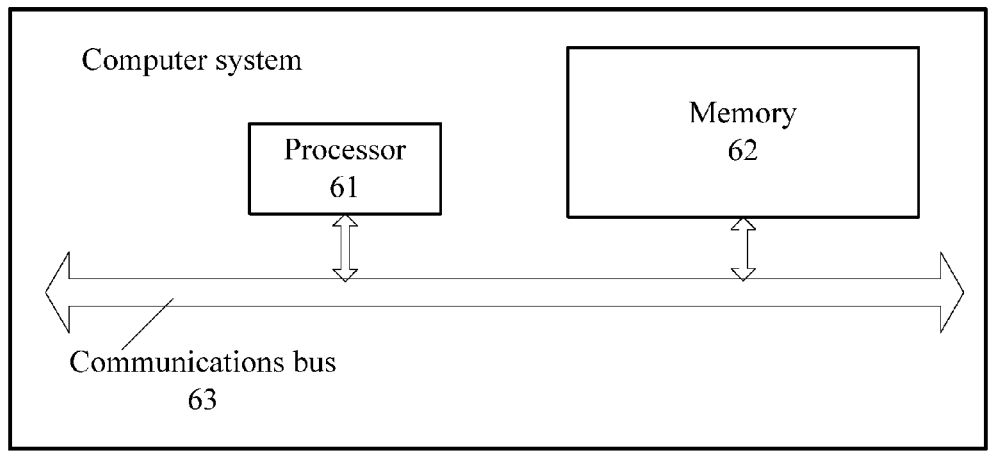
FIG. 5 is a structural diagram of a computer system according to Embodiment 4 of the present disclosure.
Figure 6:
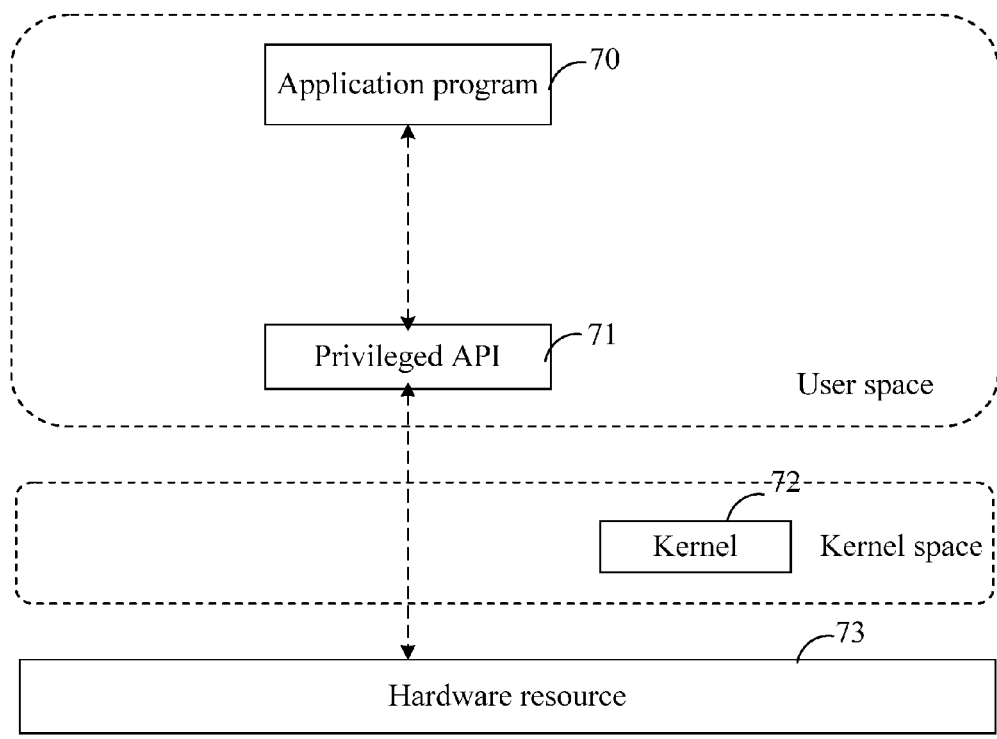
FIG. 6 is a schematic structural diagram of software and hardware in a computer system according to an embodiment of the present disclosure.

Based on the foregoing embodiments, referring to FIG. 5, this embodiment of the present disclosure provides a computer system, which includes a processor 61, a memory 62, and a communications bus 63, where the processor and the memory communicate with each other using the communications bus, the memory is configured to store instructions that need to be executed, and the processor is configured to perform, by reading the instructions stored in the memory, the methods for accessing a hardware resource described in Embodiment 1 and Embodiment 2.

For a schematic structural diagram at a software layer of a program that runs in the processor, reference may be made to FIG. 6. A dashed part in FIG. 6 represents software, which mainly includes two parts. User space and kernel space, where an application program 70 runs in the user space, a privileged API 71 exists in the user space, a kernel 72 of an operating system runs in the kernel space, and the privileged API may directly access a hardware resource without trapping into the kernel.

In this embodiment of the present disclosure, the computer system configures permission for a privileged instruction for accessing a hardware resource such that when an application program accesses a hardware resource, the application program can access the hardware resource by executing the privileged instruction encapsulated in a privileged API that is called at a code level by the application program, without trapping into a kernel. In other words, the application program can directly access the hardware resource without using the kernel, which, to some extent, resolves a problem in the prior art that to access a hardware resource, an application program needs to trap into the kernel, causing that multiple times of switching between a user mode and a kernel mode is needed, and therefore, causing excessively large system overheads, thereby reducing system overheads for accessing the hardware resource and improving processing efficiency.

Embodiment 5

Based on the foregoing embodiments, this embodiment of the present disclosure provides a non-volatile storage medium, where the non-volatile storage medium includes some instructions, which may be executed by a processor in a computer to implement the methods for accessing a hardware resource described in Embodiment 1 and Embodiment 2.

When the instructions in the non-volatile storage medium in this embodiment of the present disclosure is executed, permission for a privileged instruction for accessing a hardware resource is configured such that when an application program accesses a hardware resource, the application program can access the hardware resource by executing the privileged instruction encapsulated in a privileged API that is called at a code level by the application program, without trapping into a kernel. In other words, the application program can directly access the hardware resource without using the kernel, which, to some extent, resolves a problem in the prior art that to access a hardware resource, an application program needs to trap into the kernel, causing that multiple times of switching between a user mode and a kernel mode is needed, and therefore, causing excessively large system overheads, thereby reducing system overheads for accessing the hardware resource and improving processing efficiency.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for accessing a hardware resource, comprising:
   configuring permission for one or more privileged instructions that are used for accessing the hardware resource such that when used by a user mode application program, the privileged instructions can access the hardware resource without trapping into a kernel, wherein the application program calls, at a code level, a privileged application programming interface (API) that is in user mode and has the privileged instructions encapsulated therein; and
   executing the privileged instructions that are encapsulated in the privileged API that is called at the code level by the application program.

2. The method according to claim 1, wherein configuring permission for one or more privileged instructions that are used for accessing the hardware resource comprises calling an interface that is related to instruction permission configuration and corresponds to a processor that supports hardware virtualization, to configure the permission for the privileged instructions that are used for accessing the hardware resource.

3. The method according to claim 1, wherein before the one or more privileged instructions that are encapsulated in the privileged API that is called at the code level by the application program are executed, the method further comprises determining, using the kernel, that the application program has permission to call the privileged API to access the hardware resource.

4. The method according to claim 3, wherein determining, using the kernel, that the application program has permission to call the privileged API to access the hardware resource comprises determining, using the kernel according to a current hardware resource allocation status, to allow or partly allow a request of the application program for accessing the privileged API and a range of an instruction operation object when the application program applies, from the kernel, for calling the privileged API to directly access the hardware resource, and wherein it indicates that the application program has the permission to call the privileged API to access the hardware resource.

5. The method according to claim 1, wherein the one or more privileged instructions are one or more of a processor access instruction, a memory resource access instruction, a translation lookaside buffer (TLB) access instruction, an interrupt access instruction, a network access instruction, an input/output (I/O) hardware device access instruction, a disk access instruction, and a register read/write instruction.

6. The method according to claim 1, wherein executing the one or more privileged instructions that are encapsulated in the privileged API that is called at the code level by the application program comprises:
- determining, according to a kernel policy, that a request of the application program for accessing the hardware resource does not need to trap into the kernel after receiving the request of the application program for accessing the hardware resource; and
- directly executing the privileged instructions.

7. An apparatus for accessing a hardware resource, comprising:
- a processor;
- a memory; and
- a bus, wherein the processor and the memory communicate with each other using the bus,
- wherein the memory is configured to store instructions,
- wherein the processor is configured to execute the instructions to:
  - configure permission for one or more privileged instructions that are used for accessing the hardware resource such that when used by a user mode application program, the privileged instructions can access the hardware resource without trapping into a kernel, and wherein the application program calls, at a code level, a privileged application programming interface (API) that is in user mode and has the privileged instructions encapsulated therein; and
  - execute the privileged instructions that are encapsulated in the privileged API that is called at the code level by the application program.

8. The apparatus according to claim 7, wherein the processor is further configured to execute the instructions to:
- call an interface that is related to instruction permission configuration and corresponds to the processor that supports hardware virtualization; and
- configure the permission for the one or more privileged instructions such that when the privileged instructions are used by the user mode application program, the application program can access the hardware resource without trapping into the kernel.

9. The apparatus according to claim 7, wherein the processor is further configured to execute the instructions to determine, using the kernel, that the application program has permission to call the privileged API to access the hardware resource after configuring the permission for the one or more privileged hardware access instructions.

10. The apparatus according to claim 9, wherein the processor is further configured to execute the instructions to determine, using the kernel according to a current hardware resource allocation status, to allow or partly allow a request of the application program for accessing the privileged API and a range of an instruction operation object when the application program applies, from the kernel, for calling the privileged API to directly access the hardware resource, and wherein it indicates that the application program has the permission to call the privileged API to access the hardware resource.

11. The apparatus according to claim 7, wherein the one or more privileged instructions are one or more of a processor access instruction, a memory resource access instruction, a translation lookaside buffer (TLB) access instruction, an interrupt access instruction, a network access instruction, an input/output (I/O) hardware device access instruction, a disk access instruction, and a register read/write instruction.

12. The apparatus according to claim 7, wherein the processor is further configured to execute the instructions to:
- determine, according to a kernel policy, that a request of the application program for hardware access does not need to trap into the kernel after receiving the request of the application program for accessing the hardware resource; and
- directly execute the one or more privileged instructions.

13. A non-volatile storage medium, comprising computer execution instructions, wherein when the instructions are executed by a processor coupled to the non-volatile storage medium, causes the processor to:
- configure permission for one or more privileged instructions that are used for accessing a hardware resource such that when used by a user mode application program, the privileged instructions can access the hardware resource without trapping into a kernel, and wherein the application program calls, at a code level, a privileged application programming interface (API) that is in user mode and has the privileged instructions encapsulated therein; and
- execute the privileged instructions that are encapsulated in the privileged API that is called at the code level by the application program.

14. The storage medium according to claim 13, wherein the processor is further caused to call an interface that is related to instruction permission configuration and corresponds to the processor that supports hardware virtualization, to configure the permission for the one or more privileged instructions that are used for accessing the hardware resource such that when the privileged instructions are used by the user mode application program, the application program can access the hardware resource without trapping into the kernel.

15. The storage medium according to claim 13, wherein the processor is further caused to determine, using the kernel, that the application program has permission to call the privileged API to access the hardware resource.

16. The storage medium according to claim 15, wherein the processor is further caused to determine, using the kernel according to a current hardware resource allocation status, to allow or partly allow a request of the application program for accessing the privileged API and a range of an instruction operation object when the application program applies, from the kernel, for calling the privileged API to directly access the hardware resource, and wherein it indicates that the application program has the permission to call the privileged API to access the hardware resource.

17. The storage medium according to claim 13, wherein the one or more privileged instructions are one or more of a processor access instruction, a memory resource access instruction, a translation lookaside buffer (TLB) access instruction, an interrupt access instruction, a network access instruction, an input/output (I/O) hardware device access instruction, a disk access instruction, and a register read/write instruction.

18. The storage medium according to claim 13, wherein the processor is further caused to:
- determine, according to a kernel policy, that a request of the application program for accessing the hardware resource does not need to trap into the kernel after receiving the request of the application program for accessing the hardware resource; and
- directly execute the one or more privileged instructions.

* * * * *